United States Patent Office 3,081,229
Patented Mar. 12, 1963

3,081,229
PHENOTHIAZINES WITH ANTIHISTAMINIC AND ANTIPSYCHOTIC ACTIVITY
William F. Bruce, Havertown, Frank L. Muehlmann, Philadelphia, and Jerome M. Glassman, Havertown, Pa., assignors to American Home Products Corporation, New York, N.Y., a corporation of Delaware
No Drawing. Filed Dec. 9, 1958, Ser. No. 779,064
4 Claims. (Cl. 167—65)

The present invention deals with new phenothiazine derivatives and, more particularly, concerns phenothiazine bases which have been substituted in the 10-position, and salts thereof.

The new phenothiazine bases have the general formula

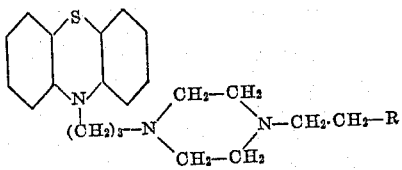

where R represents either a hydroxy or an acetoxy radical.

These bases, and the non-toxic acid-addition salts of the bases, have shown exceptional activity as antihistamines as well as being useful for the control of excitatory or psychotic conditions. Where R in the above formula represents a hydroxy radical, the antihistaminic action is full and prompt. On the other hand, where R is an acetoxy radical, the antihistaminic action does not become fully effective immediately but only after about an hour. Thereafter, its action is potent and remains so for a substantial length of time. Thus, the latter has considerable value as a delayed antihistaminic which would be active over a long period of time. Considering the fact that the compounds of the invention are free of radicals known to cause liver or blood damage, the lack of toxicity in prolonged therapy becomes important.

The new phenothiazines may be prepared by reacting a halo-propyl phenothiazine with N-hydroxyethyl piperazine on an approximately equimolar basis, using butyl alcohol as the solvent medium, and operating at refluxing temperature in the presence of an acid-binding agent until reaction is complete. The product may be isolated as the free base, or if an acid-addition salt is desired, the reaction product or the base may be treated with the appropriate organic or inorganic acid, preferably in a suitable solvent medium.

To form the acetoxy derivative, the hydroxy compound, prepared as described above, is dissolved in a suitable solvent such as acetone and reacted with an excess of ketene. After reaction is completed, the mixture is heated to remove excess ketene reactant, leaving the desired acetoxy derivative dissolved in the acetone solution. The product maye isolated as the acid-addition salt in the usual way by reacting an organic or inorganic acid therewith.

The following examples illustrate the invention in greater detail.

EXAMPLE 1

Preparation of N-[γ-1-(4-Beta-Hydroxyethyl Piperazino)-Propyl] Phenothiazine Dimaleate 13.8 g. of N-γ-chloropropyl phenothiazine, 6.8 ml. of N-beta-hydroxyethyl piperazine, 50 ml. of butyl alcohol and 5 g. sodium bicarbonate is refluxed for 6 hours. The butyl alcohol is removed, the residue dissolved in acetone and dried over potassium carbonate. 15 g. of maleic acid are dissolved in 50 ml. of hot acetone and this is added with stirring to the above filtered acetone solution. A light yellow precipitate is formed which is filtered off and washed with acetone. This can be recrystallized from water or alcohol. The product melts at 155°.

Analysis, percent.—Calcd.: C, 57.89; H, 5.86; N, 6.98; S, 5.33. Found: C, 58.05; H, 5.95; N, 7.12; S, 4.85.

EXAMPLE 2

Preparation of N-[γ-1-(4-Beta-Acetoxyethyl Piperazino)-Propyl] Phenothiazine Dimaleate In order to obtain the corresponding acetate, the acetone solution of the base above is treated with an excess of ketene. The acetone solution is heated on a water-bath to drive off the excess ketene. 15 g. of maleic acid dissolved in 50 ml. of acetone is then added with stirring. A light yellow precipitate is formed which is filtered off. This can be recrystallized from water or alcohol. The product melts at 180°.

Analysis, percent.—Calcd.: C, 57.84; H, 5.79; S, 4.98. Found: C, 58.34; H, 5.89; S, 4.73.

While the above examples indicate the preparation of the dimaleate salt specifically, this is not intended to be limitative of the invention since other inorganic and organic acids may be used to form desired acid-addition salts which are non-toxic at the therapeutic dosage level. Thus, among the inorganic acids which are useful and effective may be mentioned hydrochloric, phosphoric and sulfuric acids. With regard to organic acids, besides the maleic acid used in the examples, preferred acids are citric, succinic and tartaric acids. The latter has been found to produce a particularly effective salt that is substantially water-soluble and relatively non-hygroscopic. Where it is desired to merely isolate the base from a reaction or extract medium, other acids which result in insoluble salts may be used. Thus, oxalic acid forms a relatively water-insoluble salt useful for isolation purposes and, once isolated, other salts may be made in accordance with known procedures.

The phenothiazines of the invention, and particularly the non-toxic acid-addition salts of the bases are generally utilized in the form of compositions comprising solid or liquid carriers. They may be used either as tablets or capsules combined with the usual excipients, as for example starch or lactose, or in the form of liquid medicinals either in ampule form or as suspensions for oral or parenteral use. Where suspensions are involved, one may use either an oil or aqueous medium and suspending agents such as gelatine, agar, natural or synthetic gums, as for example gum arabic, methyl cellulose or carboxymethyl cellulose are contemplated.

The therapeutic action of the compounds of the invention is best utilized in the range of about 5 to about 100 milligrams per dosage unit.

This application is a continuation-in-part of application Serial No. 694,487 filed November 5, 1957, now abandoned.

We claim:
1. As a therapeutic composition in dosage form useful for the control of excitatory conditions as well as having substantial antihistaminic action, a non-toxic acid-addition salt of N-[γ-1-(4-beta-hydroxyethyl piperazino)propyl]phenothiazine and a pharmaceutically acceptable carrier therefor, a dosage unit of said composition containing from about 5 to about 100 milligrams of the phenothiazine compound.

2. As a therapeutic composition useful as an antihistaminic as well as for the control of excitatory conditions, the combination of a phenothiazine compound of the group consisting of N-[γ-1-(4-β-hydroxyethyl piperazino) propyl]phenothiazine and non-toxic acid-addition salts thereof, combined with a pharmaceutically acceptable carrier, a dosage unit of said composition containing from about 5 to about 100 milligrams of the phenothiazine compound.

3. The composition of claim 2; wherein the carrier comprises a solid excipient.

4. The composition of claim 2; wherein the carrier comprises a liquid vehicle.

References Cited in the file of this patent

UNITED STATES PATENTS

| | | |
|---|---|---|
| 2,534,237 | Cusic | Dec. 19, 1950 |
| 2,645,640 | Charpentier | July 14, 1953 |
| 2,766,235 | Cusic | Oct. 9, 1956 |
| 2,838,507 | Cusic | June 10, 1958 |
| 2,860,138 | Sherlock | Nov. 11, 1958 |
| 2,928,767 | Gulesich et al. | Mar. 15, 1960 |

FOREIGN PATENTS

| | | |
|---|---|---|
| 23,597/56 | Australia | May 30, 1957 |
| 203,708 | Australia | Oct. 20, 1955 |

OTHER REFERENCES

Viaud: Journal Pharm. and Pharmacol. 6, pp. 361–389 (1954).

Martin et al.: Arzn. Forsch., vol. 7, pp. 408–9 (1956).

Rosenkilde: J. Pharm. Exp. Therap., August 1957, pp. 375–387.

Viaud: Translation of reprint from article cited in original action, pp. 11–12.